(12) United States Patent
Oyama et al.

(10) Patent No.: US 11,196,891 B2
(45) Date of Patent: Dec. 7, 2021

(54) IMAGE READING APPARATUS

(71) Applicant: Brother Kogyo Kabushiki Kaisha, Nagoya (JP)

(72) Inventors: Yoshihiro Oyama, Tokai (JP); Yoshihiro Okamoto, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/082,162

(22) Filed: Oct. 28, 2020

(65) Prior Publication Data
US 2021/0127029 A1 Apr. 29, 2021

(30) Foreign Application Priority Data
Oct. 28, 2019 (JP) .............................. JP2019-195430

(51) Int. Cl.
*H04N 1/04* (2006.01)
*H04N 1/12* (2006.01)
*H04N 1/028* (2006.01)

(52) U.S. Cl.
CPC ........... *H04N 1/1235* (2013.01); *H04N 1/028* (2013.01)

(58) Field of Classification Search
CPC .. H04N 1/1235; H04N 1/028; H04N 1/00519; H04N 1/00551; H04N 1/00554; G03G 15/605
USPC ......... 358/498, 496, 401, 501; 399/379, 380
See application file for complete search history.

(56) References Cited

U.S. PATENT DOCUMENTS

| | | | | |
|---|---|---|---|---|
| 7,536,148 | B2 * | 5/2009 | Fukumura | ............ G03G 15/602 358/496 |
| 10,131,512 | B2 | 11/2018 | Tada et al. | |
| 2012/0113482 | A1 * | 5/2012 | Sakai | ................... H04N 1/1225 358/474 |
| 2017/0183181 | A1 * | 6/2017 | Tada | ..................... G03G 15/602 |
| 2018/0091670 | A1 * | 3/2018 | Murodate | .......... H04N 1/00554 |
| 2018/0278773 | A1 * | 9/2018 | Kii | ...................... H04N 1/00557 |

FOREIGN PATENT DOCUMENTS

| | | |
|---|---|---|
| JP | 2007-074065 A | 3/2007 |
| JP | 2012-015839 A | 1/2012 |
| JP | 2017-120958 A | 7/2017 |

* cited by examiner

*Primary Examiner* — Cheukfan Lee
(74) *Attorney, Agent, or Firm* — Banner & Witcoff, Ltd.

(57) ABSTRACT

An image reading apparatus includes a main body part and an openable part. On an upper surface of the main body part, a first reading surface, a second reading surface and a first guide part arranged between the two reading surfaces are provided. When a direction parallel to a direction in which an original passes over the second reading surface is defined as a first direction, and a direction parallel to the second reading surface and orthogonal to the first direction is defined as a second direction, on the upper surface, a positioning convex part having a curved surface curved downward when viewed in the second direction is provided on an extended line of the first guide part. On a lower surface of the openable part, a positioning concave part having two inclined surfaces respectively contacting the curved surface when viewed in the second direction is provided.

7 Claims, 7 Drawing Sheets

IMAGE READING APPARATUS

CROSS-REFERENCE TO RELATED APPLICATION

This application claims priority under 35 U.S.C. § 119 from Japanese Patent Application No. 2019-195430 filed on Oct. 28, 2019. The entire subject matter of the application is incorporated herein by reference.

BACKGROUND

Technical Field

Aspects of the present disclosure relate to an image reading apparatus.

Related Art

There has been known an original reading apparatus which includes an original reading part, an original pressing device, an ADF (an automatic document feeder) and hinges.

On an upper surface of the original reading part, a first contact glass onto which an original is to be placed and a second contact glass over which an original passes are provided. The original pressing device is provided above the original reading part. The ADF is provided to the original pressing device and conveys an original such that the original passes over the second contact glass. The second contact glass is long in a direction perpendicular to a direction in which the original passes over the second contact glass and is arranged beside the first contact glass with a longer side of the second contact glass along a side of the first contact glass. The hinges couple the original pressing device to the original reading part such that the original pressing device can swing about an axis parallel to the direction in which the original passes over the second contact glass to open and close with respect to the original reading part.

Inside the conventional original reading part, there is typically provided a reading sensor that is capable of reading both an image on an original placed onto the first contact glass and an image on an original passing over the second contact glass.

On the upper surface of the original reading part, a convex part is provided. The convex part is disposed on a side opposite to the hinge with respect to the first contact glass and the second contact glass and on an extended line of the second contact glass in the longitudinal direction, and is protruding upward. The convex part is configured to retract when it is depressed. On a lower surface of the original pressing device, a concave part is provided. The concave part is disposed at a position that opposes to the convex part in a state where the original pressing device is closed and is recessed upward such that the convex part fits in the concave part.

The conventional original reading apparatus having the above-described configuration is configured to position the original pressing device with respect to the original reading part in a state where the original pressing device is closed by using the hinge and the convex part and concave part that fit to each other. Furthermore, in this original reading apparatus, in a case where the original pressing device is closed in a state where a portion of an original placed onto the first contact glass is covering the convex part, the convex part retracts as the original is nipped between the convex part and the concave part and thus damage on the original is suppressed.

There is also a conventional image reading apparatus including, in place of the convex part and the concave part described above, a positioning pin provided on the upper surface of the original reading part and a positioning boss hole provided on the lower surface of the ADF (i.e., on the lower surface of the original pressing device).

The positioning pin is configured to be capable to protrude higher than the upper surface of the original reading part and to retract below the upper surface of the original reading part. The positioning pin protrudes higher than the upper surface of the original reading part when the ADF is in use. In a state where the ADF is closed, the ADF is positioned with respect to an image reading unit provided in the original reading part by the positioning pin fitted in the positioning boss hole.

On the other hand, the positioning pin retracts below the upper surface of the original reading part when the ADF is not in use. With this configuration, in a case where the ADF is closed in a state where a portion of an original placed onto the first contact glass of the original reading part is covering the positioning pin, the original will not be nipped between the positioning pin and the positioning boss hole and thus damage on the original is suppressed.

SUMMARY

However, in the conventional original reading apparatus having the convex part and the concave part, in a state where the ADF is closed, since the convex part is fitted to the concave part, shearing force acts on the convex part when force that causes the original pressing device to laterally slide is applied to the original pressing device and thus there is a risk that the convex part or the concave part breaks.

Also, in the conventional image reading apparatus having the positioning pin and the positioning boss hole, when the ADF is in use, since the ADF is closed and the positioning pin is fitted to the positioning boss hole, shearing force acts on the positioning pin when force that causes the ADF to laterally slide is applied to the ADF and thus there is a risk that the positioning pin or the positioning boss hole breaks.

According to aspects of the present disclosure, there is provided an image reading apparatus including a main body part, an openable part, an automatic document feeder, a reading sensor and a hinge. On an upper surface of the main body part, a first reading surface onto which an original is to be placed, a second reading surface over which an original passes, and a first guide part arranged between the first reading surface and the second reading surface and configured to scoop up an original passing over the second reading surface are provided. The openable part is provided above the main body part. The automatic document feeder is provided to the openable part and is configured to convey an original to pass over the second reading surface and the first guide part. The reading sensor is provided within the main body part and is capable of reading an image on an original placed onto the first reading surface and an image of an original passing over the second reading surface. The hinge is configured to couple the openable part to the main body part such that the openable part is swingable between an open position and a closed position. When a direction parallel to a direction in which an original passes over the second reading surface while being conveyed parallel to the second reading surface is defined as a first direction, and a direction parallel to the second reading surface and orthogonal to the first direction is defined as a second direction, on the upper surface of the main body part, a positioning convex part protruding upward is provided, the positioning convex part being arranged on the opposite side of the hinge with respect to the first reading surface and the second reading surface on an extended line of the first guide part and protruding upward. On a lower surface of the openable part, a positioning concave part concaved upward is provided, the positioning concave part being arranged at a position opposing the positioning convex part in a state where the openable part is at the closed position. The positioning convex part has a curved surface curved downward from a top part while extending toward one side and the other side in the first direction when viewed in the second direction. When viewed in the second direction in the state where the openable part is at the closed position, the positioning concave part has a first inclined surface being a flat surface inclined downward toward the one side in the first direction and contacting the curved surface, and a second inclined surface being a flat surface inclined downward toward the other side in the first direction and contacting the curved surface.

According to aspects of the present disclosure, there is further provided an image reading apparatus including a main body part, an openable part, an automatic document feeder, an reading sensor, and a hinge. On an upper surface of the main body part, a first reading surface onto which an original is to be placed, a second reading surface over which an original passes, and a second guide part arranged opposite to the first reading surface with respect to the second reading surface and configured to guide an original toward the second reading surface are provided. The openable part is provided above the main body part. The automatic document feeder is provided to the openable part and is configured to convey an original to pass over the second guide part and the second reading surface. The reading sensor is provided within the main body part and is capable of reading an image on an original placed onto the first reading surface and an image of an original passing over the second reading surface. The hinge is configured to couple the openable part to the main body part such that the openable part is swingable between an open position and a closed position. When a direction parallel to a direction in which an original passes over the second reading surface while being conveyed parallel to the second reading surface is defined as a first direction, and a direction parallel to the second reading surface and orthogonal to the first direction is defined as a second direction, on the upper surface of the main body part, a positioning convex part protruding upward is provided. The positioning convex part is arranged on the opposite side of the hinge with respect to the first reading surface and the second reading surface on an extended line of the second guide part. On a lower surface of the openable part, a positioning concave part concaved upward is provided. The positioning concave part is arranged at a position opposing the positioning convex part in a state where the openable part is at the closed position. The positioning convex part has a curved surface curved downward from a top part while extending toward one side and the other side in the first direction when viewed in the second direction. When viewed in the second direction in the state where the openable part is at the closed position, the positioning concave part has a first inclined surface being a flat surface inclined downward toward the one side in the first direction and contacting the curved surface, and a second inclined surface being a flat surface inclined downward toward the other side in the first direction and contacting the curved surface.

BRIEF DESCRIPTION OF THE ACCOMPANYING DRAWINGS

DETAILED DESCRIPTION

Hereinafter, the first and second embodiments embodying aspects of the present disclosure will be described with reference to the accompanying drawings.

First Embodiment

Figure 1:
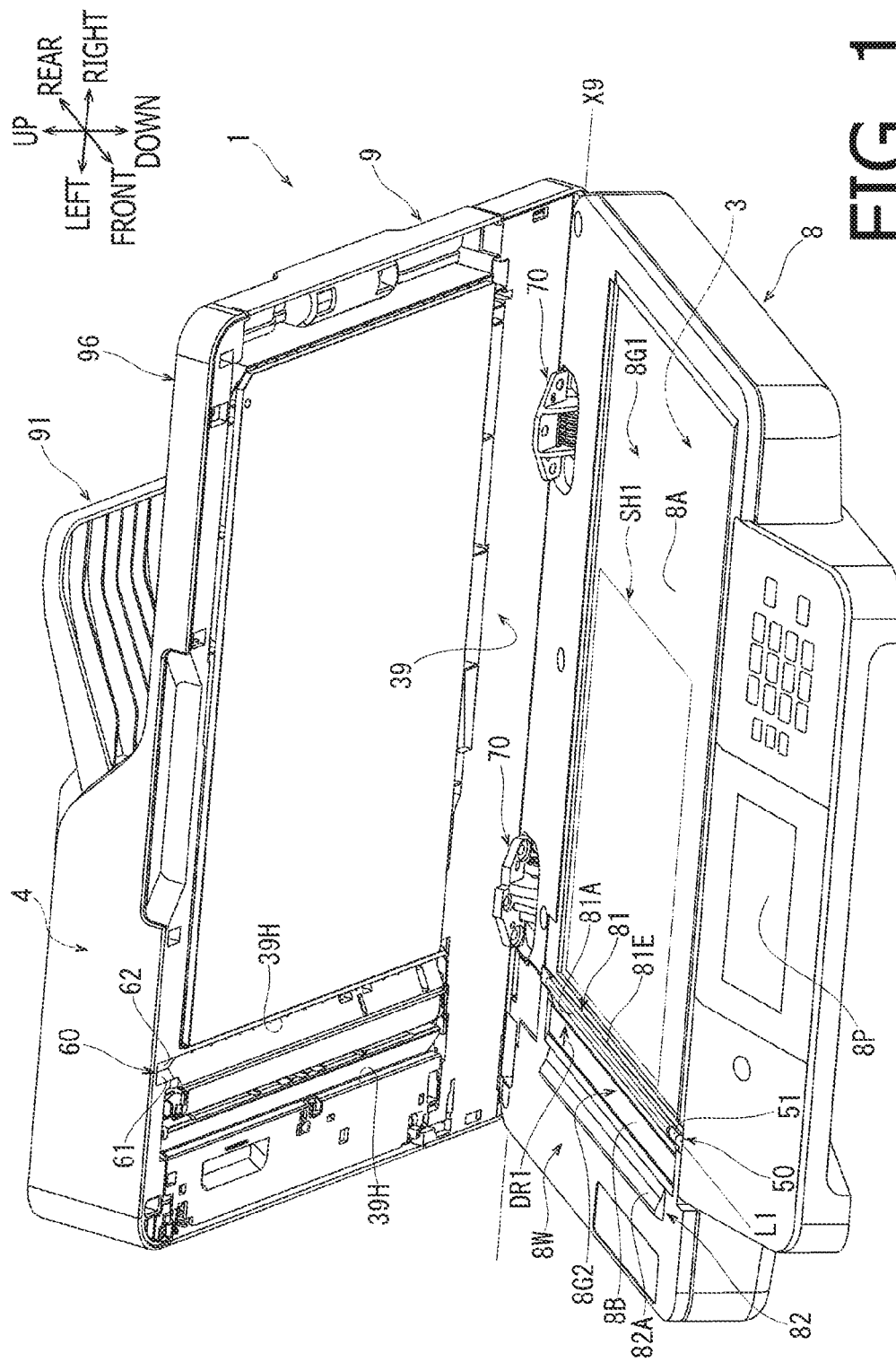
FIG. 1 is a perspective view of an image reading apparatus according to the first embodiment.

FIG. 1 shows an image reading apparatus 1 according to the first embodiment being one of specific image reading apparatuses according to the present disclosure. In FIG. 1, a front side, a rear side, a left-hand side, a right-hand side, an upside and downside are indicated by defining a side of the apparatus on which an operation panel 8P is arranged as the front side and a side of the apparatus on the left-hand side when facing the operation panel 8P as the left-hand side. Directions shown in FIG. 2 and after correspond to the directions indicated in FIG. 1. Hereinafter, components included in the image reading apparatus 1 will be described based on the drawings.

<Overall Configuration>

Figure 2:
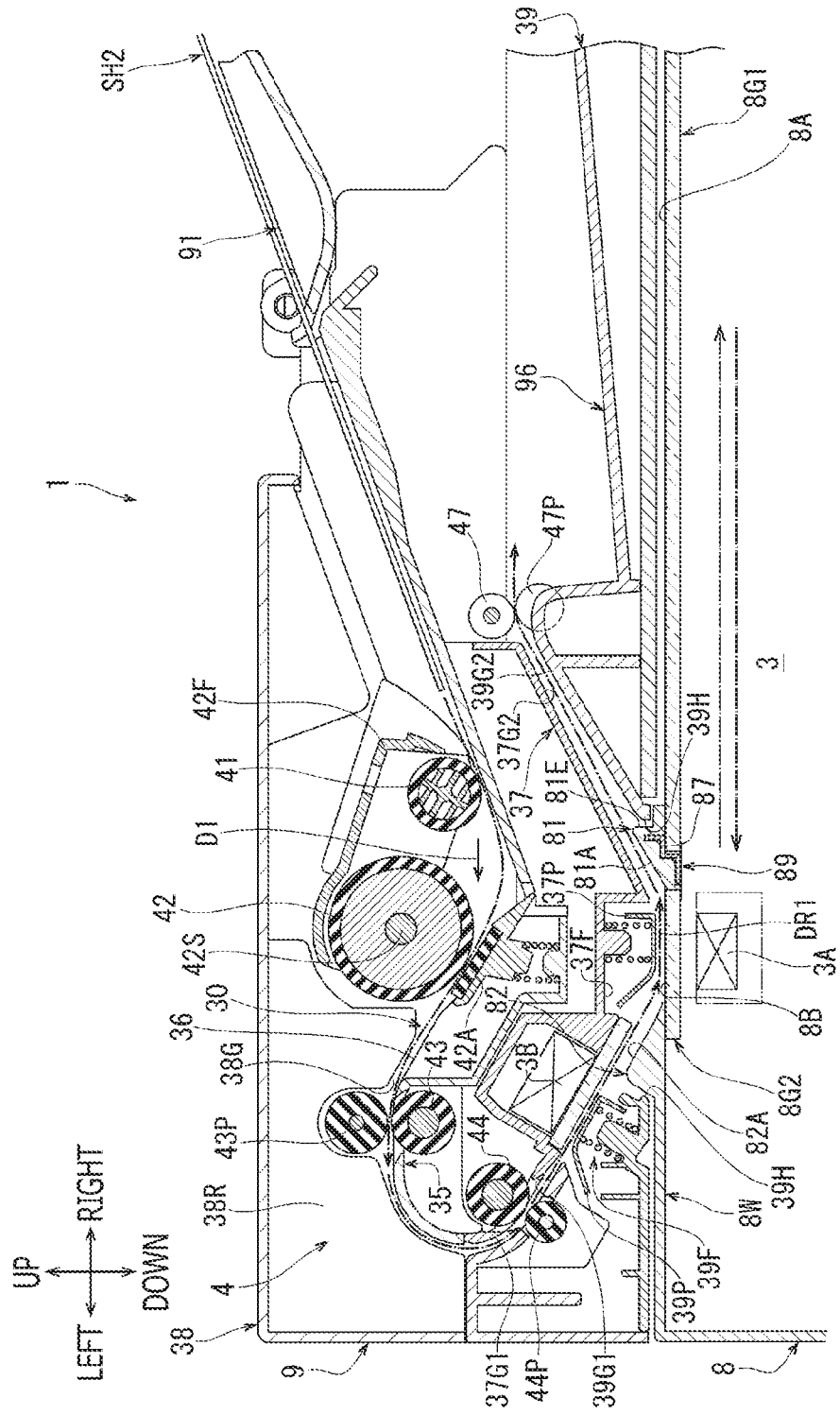
FIG. 2 is a schematic partial cross-sectional view of the image reading apparatus according to the first embodiment.

As shown in FIGS. 1 and 2, the image reading apparatus 1 includes a main body part 8, and an openable part 9 arranged above the main body part 8. The main body part 8 has a substantially flattened box-like shape. As shown in FIG. 1, on a front surface of the main body part 8, an operation panel 8P such as a touch panel is provided. Inside the main body part 8, a reading unit 3 is provided. The reading unit 3 is used when reading an image on an original SH1 or SH2.

At a rear-end portion of the main body part 8, two hinges 70 are arranged apart from each other in the left-right direction. The hinges 70 couple the openable part 9 to the main body part 8 to be swingable about a swing axis X9 extending in the left-right direction. The openable part 9 swings about the swing axis X9 between an open position and a closed position.

As shown in FIG. 1, the openable part 9 exposes an upper surface of the main body part 8 when in an opened state. On the other hand, as shown in FIG. 2, the openable part 9 covers the upper surface of the main body part 8 when in a closed state. In the following description regarding configurations and internal structures of the openable part 9, the up-down direction and the front-rear direction indicates directions in a state where the openable part 9 is in the closed state.

To the openable part 9, an original tray 91, an ejection tray 96 and an ADF (automatic document feeder) 4 are provided. The original tray 91 and the ejection tray 96 are provided on a right portion of the openable part 9.

The original tray 91 is supported by side frames respectively arranged on a front end portion and a rear end portion of the openable part 9 and is positioned above the ejection tray 96 to overlap therewith. The original tray 91 is gently inclined downward from a right end portion of the openable part 9 toward the left.

The original tray 91 supports the sheet-like original SH2 being a conveying target by the ADF 4. The ADF 4 includes a conveyance guide 30 provided on a downstream side with respect to the original tray 91 in a conveying direction D1 of the original SH2. The conveying direction D1 of the original SH2 guided by the conveyance guide 30 is a direction that advances leftward from the original tray 91, makes a U turn downward at a left end portion of the openable part 9 and finally advances rightward up to the ejection tray 96.

The ADF 4 is used when conveying the originals SH2 supported by the original tray 91 along the conveyance guide 30 in the conveying direction D1 and ejecting them on the ejection tray 96 one by one while causing the reading unit 3 to read images on the conveyed originals SH2.

As shown in FIG. 1, the upper surface of the main body part 8 consists of a frame 8W, a first platen glass 8G1 and a second platen glass 8G2. The frame 8W is a resin member to which a rectangular opening surrounding the first platen glass 8G1 and another rectangular opening surrounding the second platen glass 8G2 are formed.

A first reading surface 8A having a large surface area is formed by an upper surface of the first platen glass 8G1 exposed from the frame 8W. The second platen glass 8G2 is arranged on the left of the first platen glass 8G1. A second reading surface 8B elongated in the front-rear direction is formed by an upper surface of the second platen glass 8G2 exposed from the frame 8W.

The first reading surface 8A supports an original SH1 from below when the reading unit 3 reads an image on the original SH1 in a resting state. The original SH1 to be placed on the first reading surface 8A includes paper, an OHP sheet, a book, and a booklet in which pieces of paper are bound with staples, clips or the like. The original SH1 also includes a sheet or poster of a size that runs over the first reading surface 8A.

In the present embodiment, a subject of which an image is to be read using the first reading surface 8A will be herein referred to as the original SH1, and a subject of which an image is to be read while being conveyed by the ADF 4 will be herein referred to as the original SH2. The original SH1 and the original SH2 may be substantially the same.

As shown in FIG. 2, the originals SH2 that are conveyed by the ADF 4 one by one pass over the second reading surface 8B while being touched by the second reading surface 8B from below.

A direction in which the original SH2 passes over the second reading surface 8B while being conveyed parallel to the second reading surface 8B will be herein referred to as a direction DR1. The direction DR1 is a horizontal direction from the left to the right. The left-right direction parallel to the direction DR1 is an example of a "first direction" of the present disclosure. The left side is an example of "one side in the first direction" of the present disclosure. The right side is an example of "the other side in the first direction" of the present disclosure. The front-rear direction parallel to the second reading surface 8B and orthogonal to the left-right direction is an example of a "second direction" of the present disclosure.

As shown in FIGS. 1 to 4, on the upper surface of the main body part 8, a first guide part 81 and a second guide part 82 are provided.

The first guide part 81 is a convex part having a substantially right triangular cross-sectional shape, arranged on the frame 8W between the first reading surface 8A and the second reading surface 8B and protruding upward. The first guide part 81 extends in the front-rear direction from near a front end edge up to near a rear end edge of the second reading surface 8B.

Figure 5:
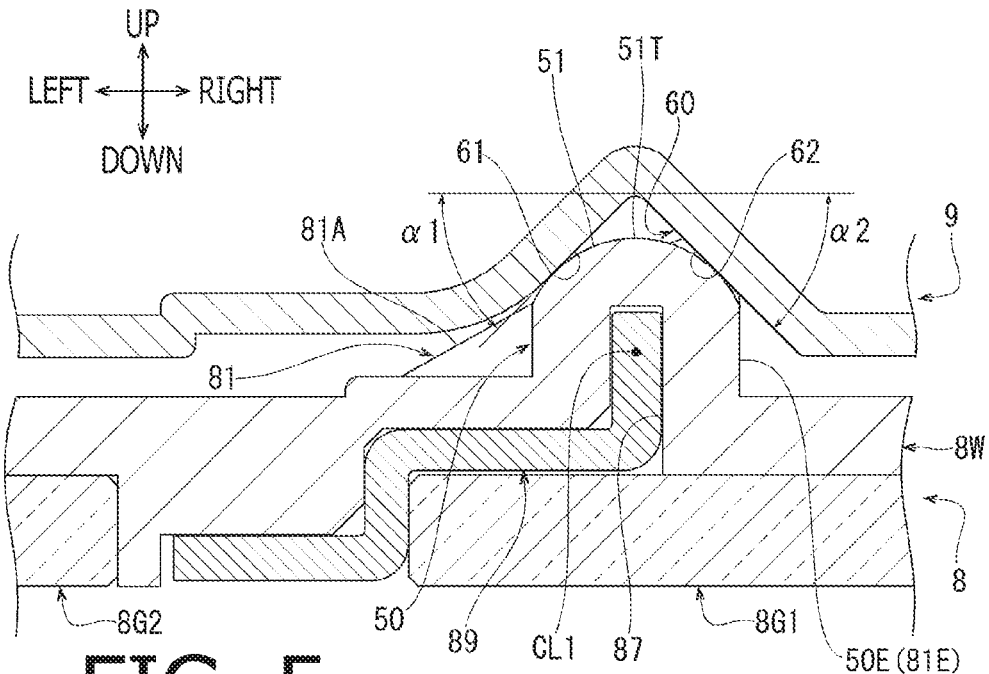
FIG. 5 is a partial cross-sectional view showing a state where a curved surface of the positioning convex part is in contact with a first inclined surface and a second inclined surface of a positioning concave part.

To the first guide part 81, an ascending inclined surface 81A and an end surface 81E are formed. The ascending inclined surface 81A is inclined upward toward the right from a position adjacent to a right end edge of the second reading surface 8B. As shown in FIG. 5, the end surface 81E is a flat surface connected to a right end edge of the ascending inclined surface 81A extending in the up-down direction and the front-rear direction on the first reading surface 8A side.

As shown in FIG. 2, the ADF 4 conveys the original SH2 in the direction DR1 to cause the original SH2 to pass over the second reading surface 8B and further pass over the first guide part 81. In this case, the first guide part 81 scoops the original SH2 up with the ascending inclined surface 81A.

To the frame 8W, a reinforcing plate 89 and a reinforcing plate inserting part 87 are provided on a lower surface side of the first guide part 81.

The reinforcing plate 89 is a metal ember having a substantially W-shaped cross-sectional shape and extending in the front-rear direction. The reinforcing plate interesting part 87 is recessed upward from the lower surface of the first guide part 81 and is extending in the front-rear direction along the first guide part 81 to conform to the shape of the reinforcing plate 89. A portion of the reinforcing plate 89 protruding upward is inserted in the reinforcing plate inserting part 87 to reinforce the first guide part 81.

Figure 3:
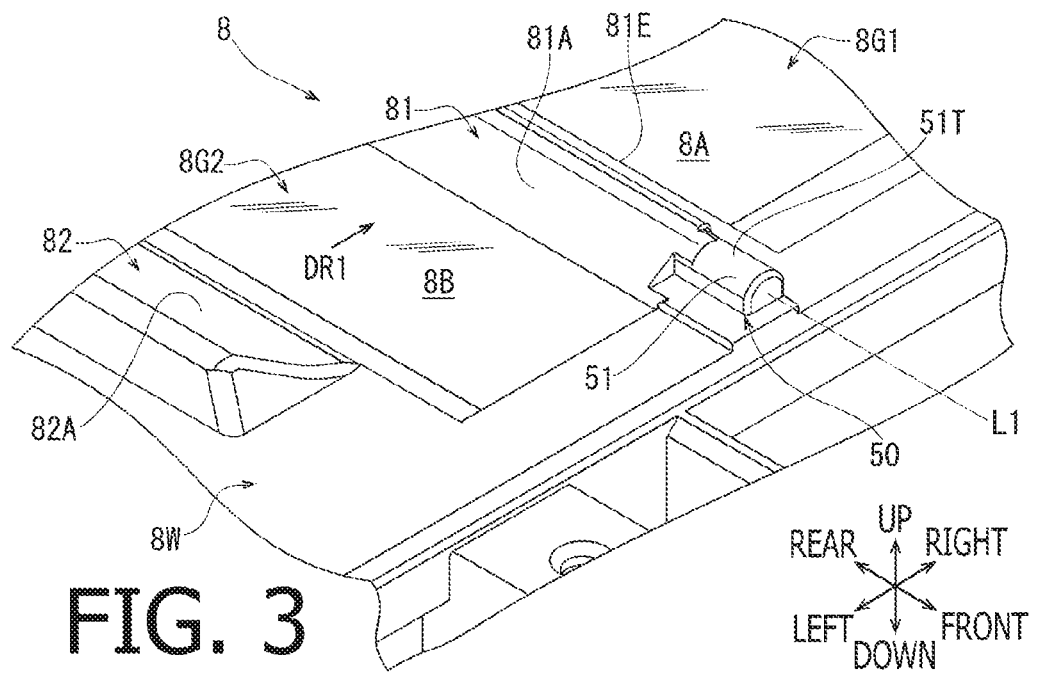
FIG. 3 is a partial perspective view showing mainly a first guide part, a positioning convex part and a second guide part.

As shown in FIGS. 1-3, the second guide part 82 is a convex part having a substantially rectangular cross-sectional shape and protruding upward that is formed to the frame 8W and arranged on the opposite side of the first reading surface 8A with respect to the second reading surface 8B, that is, on the left. The second guide part 82 is extending in the front-rear direction from near the front end edge up to near the rear end edge of the second reading surface 8B.

To the second guide part 82, a descending inclined surface 82A is formed. The descending inclined surface 82A is inclined downward and rightward toward a position adjacent to a left end edge of the second reading surface 8B.

As shown in FIG. 2, the ADF 4 conveys the original SH2 to cause the original SH2 to pass over the second guide part 82 and further pass over the second reading surface 8B. In this case, the second guide part 82 guides the original SH2 toward the second reading surface 8B with the descending inclined surface 82A.

The reading unit 3 includes a first reading sensor 3A accommodated inside the main body part 8, a conventionally known scanning mechanism driving source, and a conventionally known scanning mechanism driven by the scanning mechanism driving source. The first reading sensor 3A is an example of a "reading sensor" of the present disclosure. As the first reading sensor 3A, a conventionally known image reading sensor such as a CIS (Contact Image Sensor) or a CCD (Charge Coupled Device) is used.

The first reading sensor 3A is positioned below the first reading surface 8A and the second reading surface 8B. When reading an image on the original SH1 placed onto the first reading surface 8A, the scanning mechanism is driven by the scanning mechanism driving source to reciprocate the first reading sensor 3A in the left-right direction below the first reading surface 8A within the main body part 8. When the first reading sensor 3A reads an image on the original SH2 conveyed by the ADF 4, the scanning mechanism is driven by the scanning mechanism driving source and to cause the first reading sensor 3A to stop below the second reading surface 8B within the main body part 8. The position below the second reading surface 8B where the first reading sensor 3A stops is a preset resting reading position.

<Configurations of Base Member, First Chute Member, Second Chute Member and Cover Member>

The openable part 9 includes a base member 39, a first chute member 35, a second chute member 37 and a cover member 38.

The base member 39 forms a bottom wall of the openable part 9. A lower surface of the base member 39 is a lower surface of the openable part 9. On a right portion of the base member 39, the ejection tray 96 is formed. On a left portion of the base member 39, a reading opening 39H formed by cutting out an area opposing the second reading surface 8B, the first guide part 81 and the second guide part 82 in a substantially rectangular shape is provided.

On a left end portion of the base member 39, a conveying surface 39G1 is formed. The conveying surface 39G1 is curved to change its orientation from downward to an orientation inclined downward toward the right.

To a portion of the base member 39 positioned between the reading opening 39H and the conveying surface 39G1, a second pressing member holding part 39F is provided. At the second pressing member holding part 39F, a second pressing member 39P is movably held. The second pressing member 39P is a member for pressing the original SH2 conveyed along the conveyance guide 30 toward a second reading sensor 3B which will be described later. An upper surface of the second pressing member 39P is inclined downward toward the right from a right end of the conveying surface 39G1 toward the second guide part 82 of the main body part 8.

To a portion of the base member 39 positioned on the right with respect to the reading opening 39H, a conveying surface 39G2 is formed. The conveying surface 39G2 is inclined upward toward the right from a position adjacent to the first guide part 81 of the main body part 8.

The second chute member 37 is arranged above a left portion of the base member 39. To the second chute member 37, a first pressing member holding part 37F and guide faces 37G1 and 37G2 are formed.

The first pressing member holding part 37F is a concave part concaved upward at a position opposing the second reading surface 8B. At the first pressing member holding part 37F, a first pressing member 37P is movably held. The first pressing member 37P presses, from above, the original SH2 being conveyed while contacting the second reading surface to suppress the original SH2 from coming off the second reading surface 8B.

The guiding surface 37G1 is positioned on the left with respect to the first pressing member holding part 37F. The guiding surface 37G1 is curved along the conveying surface 39G1 of the base member 39. Then, the guiding surface 37G1 is inclined downward toward the right along the second pressing member 39P and the second guide part 82 of the main body part 8.

At the middle portion of the guiding surface 37G1 in the conveying direction D1, the second reading sensor 3B is arranged. A conventionally known controller activates the second reading sensor 3B as well as the first reading sensor 3A when reading images on both sides of the original SH2 conveyed by the ADF 4.

The guide surface 37G2 is positioned on the right with respect to the first pressing member holding part 37F. The guiding surface 37G2 is inclined upward toward the right along the first guide part 81 of the main body part 8 and the conveying surface 39G2 of the base member 39.

The first chute member 35 is arranged above the second chute member 37. To the first chute member 35, a conveying surface 36 is formed. The conveying surface 36 is positioned on a downstream side with respect to the original tray 91 in the conveying direction D1 and extends to slightly incline upward toward the left. A left end portion of the conveying surface 36 is curved to change its orientation from leftward to downward.

The cover member 38 is arranged above the first chute member 35. The cover member 38 covers a left portion of the original tray 91 from above. To the cover member 38, a guiding surface 38G consisting of lower end edges of a plurality of ribs 38R protruding downward is formed. A right portion of the guiding surface 38G extends to slightly incline upward toward the left along the conveying surface 36 of the first chute member 35. A left portion of the guiding surface 38G is curved along the left end portion of the conveying surface 36 of the first chute member 35.

The conveyance guide 30 is configure with the conveying surface 36 of the first chute member 35, the guiding surface 38G of the cover member 38, the conveying surfaces 39G1 and 39G2 of the base member 39, and the guiding surfaces 37G1 and 37G2 of the second chute member 27.

The conveying surfaces 36, 39G1 and 39G2 and the guiding surfaces 38G, 37G1 and 37G2 extend along the conveying direction D1 and define a conveyance path for conveying the original SH2 from the original tray 91 toward the ejection tray 96. The second reading surface 8B, the first guide part 81 and the second guide part 82 of the main body part 8 also define portions of the conveyance path from below.

<Configurations of Positioning Convex Part and Positioning Concave Part>

The image reading apparatus 1 includes a positioning convex part 50 shown in FIGS. 1 and 3 to 5 and a positioning concave part 60 shown in FIGS. 1 and 5 to accurately position the conveyance guide 30 of the ADF 4 and the second reading sensor 3B in the openable part 9 with respect to the first reading sensor 3A stopped at the resting reading position, the second reading surface 8B, the first guide part 81 and the second guide part 82 in the main body part 8.

As shown in FIG. 1, the positioning convex part 50 is provided on the upper surface of the main body part 8. The positioning convex part 50 is arranged on the frame 8W, on the opposite side of the hinges 70 with respect to the first reading surface 8A and the second reading surface 8B and on an extended line L1 of the first guide part 81, and is protruding upward from an upper surface of the frame 8W.

Figure 4:
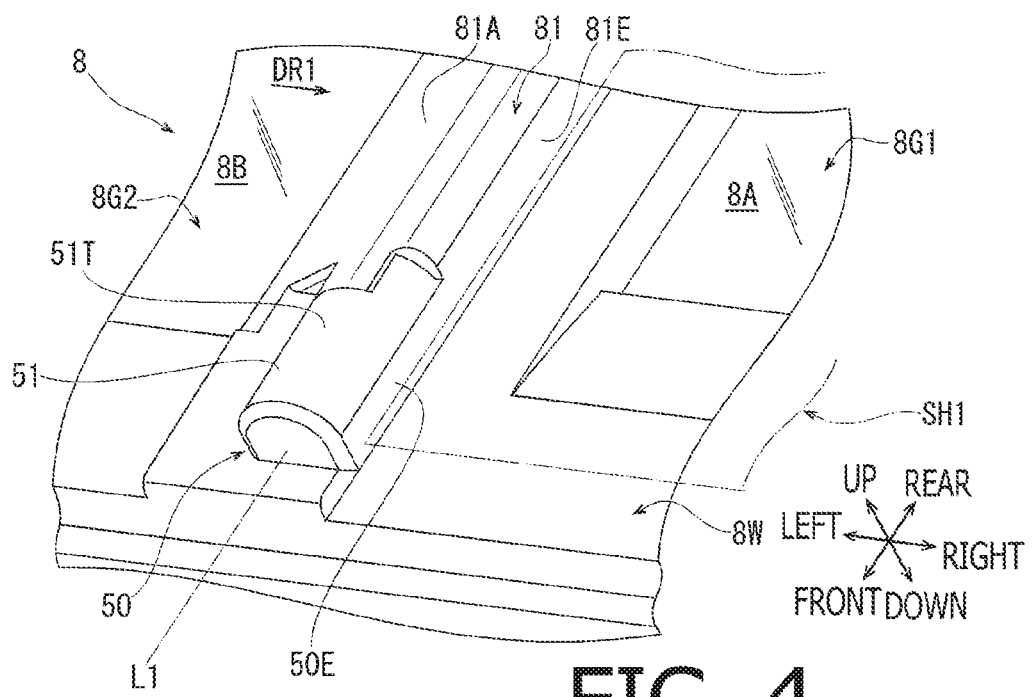
FIG. 4 is a partial perspective view showing mainly the first guide part and the positioning convex part.

As shown in FIGS. 3 and 4, the positioning convex part 50 is formed continuously with the first guide part 81 in the front-rear direction.

The positioning convex part 50 has a curved surface 51. As shown in FIG. 5, the curved surface 51 curves downward from a top part 51T while extending leftward and rightward when viewed in the front-rear direction. More specifically, the curved surface 51 is an upper section of a cylindrical surface whose center line is an axis line CL1 extending in the front-rear direction below the top part 51T.

The reinforcing plate inserting part 87 and the reinforcing plate 89 provided on the lower surface side of the first guide part 81 extends up to the positioning convex part 50. By this configuration, the positioning convex part 50 is reinforced by the reinforcing plate 89.

As shown in FIG. 4, an end surface 50E extending in the up-down direction and the front-rear direction on the first reading surface 8A side of the positioning convex part 50 is a flat surface that is coplanar with the end surface 81E extending in the up-down direction and the front-rear direction on the first reading surface 8A side of the first guide part 81.

As shown in FIG. 1, the positioning concave part 60 is provided on the lower surface of the openable part 9. The positioning concave part 60 is arranged on the base member 39 on the opposite side of the hinges 70 with respect to the reading opening 39H.

As shown in FIG. 5, the positioning concave part 60 is arranged at a position opposing the positioning convex part 50 in a state where the openable part 9 is closed and is concaved upward from the lower surface of the base member 39.

The positioning concave part 60 has a first inclined surface 61 and a second inclined surface 62. The first inclined surface 61 is a flat surface inclined downward toward the left when viewed in the front-rear direction in the state where the openable part 9 is closed. A corner on a lower end the first inclined surface 61 is rounded with a large curvature when viewed in the front-rear direction in the state where the openable part 9 is closed so that the corner does not overlap with the ascending inclined surface 81A of the first guide part 81. The second inclined surface 62 is a flat surface inclined downward toward the right when viewed in the front-rear direction in the state where the openable part 9 is closed.

An angle of downward inclination of the first inclined surface 61 with respect to the left-right direction is herein defined as an angle cd. An angle of downward inclination of the second inclined surface 62 with respect to the left-right direction is hereinafter defined as an angle $\alpha 2$. The angles $\alpha 1$ and $\alpha 2$ are equal to or less than 45 degrees. In the present embodiment, the angles $\alpha 1$ and $\alpha 2$ are set to 45 degrees. That is, an angle between the first inclined surface 61 and the second inclined surface 62 is set to 90 degrees.

In the state where the openable part 9 is closed, the first inclined surface 61 contacts a portion of the curved surface 51 away from the top part 51T on the left, and the second inclined surface 62 contacts a portion of the curved surface 51 away from the top part 51T on the right. By this configuration, a position of the positioning concave part 60 with respect to the positioning convex part 50 in the left-right direction is fixed. Therefore, in the image reading apparatus 1, in the state where the openable part 9 is closed, the openable part 9 is positioned with respect to the main body part 8 accurately by the hinges 70 and the positioning convex part 50 and positioning concave part 60 contacting with each other. As a result, the conveyance guide 30 and the second reading sensor 3B provided to the openable part 9 can be positioned accurately with respect to the first reading sensor 3A, the second reading surface 8B, the first guide part 81 and the second guide part 82 provided to the main body part 8.

<Configurations of Feeding Roller, Separating Roller, First and Second Conveying Rollers and Ejecting Roller>

The ADF 4 includes a feeding roller 41, a separating roller 42, a separating pad 42A, a first conveying roller 43, a first pinch roller 43P, a second conveying roller 44, a second pinch roller 44P, an ejecting roller 47 and an ejecting pinch roller 47P for conveying the original SH2 along the conveyance guide 30.

The separating roller 42 is arranged on the first chute member 35 above the conveying surface 36. A holder 42F is rotatably supported by a rotation shaft 42S of the separating roller 42.

The feeding roller 41 is rotatably held at the right portion of the holder 42F and is opposed to the original tray 91 from above. The feeding roller 41 feeds the original SH2 supported by the original tray 91 toward the conveying surface 36 of the conveyance guide 30.

The separating pad 42A is supported by the first chute member 35 right below the separating roller 42 so as to be exposed from the conveying surface 36. The separating pad 42A is pressed toward the separating roller 42.

The separating roller 42 applies conveying force toward the downstream side in the conveying direction D1 to the original SH2 attained to a nipping position between the separating roller 42 and the separating pad 42A. If a plurality of originals SH2 attain the nipping position, the separating pad 42A applies force for stopping conveyance of the originals SH2 other than an original SH2 which is in contact with the separating roller 42.

The first conveying roller 43 is supported by the first chute member 35 at the middle portion of the conveying surface 36 in the conveying direction D1. The first pinch roller 43P is supported by the cover member 38 on the guiding surface 38G side and is pressed toward the first conveying roller 43.

The second conveying roller 44 is supported on the guiding surface 37G1 of the second chute member 37 on a downstream side with respect to the second reading sensor 3B in the conveying direction D1. The second pinch roller 44P is supported by the base member 39 on the conveying surface 39G1 side and is pressed toward the second conveying roller 44.

The first conveying roller 43, the first pinch roller 43P, the second conveying roller 44 and the second pinch roller 44P convey the originals SH2 separated one by one by the separating roller 42 and the separating pad 42A toward the second reading surface 8B, that is, toward the first reading sensor 3A at rest at the resting reading position.

The ejecting roller 47 is supported on a right end portion of the guiding surface 37G2 of the second chute member 37. The ejecting pinch roller 47P is supported on a right end portion of the conveying surface 39G2 of the base member 39 and is pressed toward the ejecting roller 47. The ejecting roller 47 and the ejecting pinch roller 47P eject the original SH2 that passed over the second reading surface 8B and were guided by the conveying surface 39G2 and the guiding surface 37G2 toward the ejection tray 96.

<Image Reading Behavior>

In the present image reading apparatus 1, when reading an image on the original SH1 supported by the first reading surface 8A, the controller controls the scanning mechanism driving source of the reading unit 3 to activate the scanning mechanism and cause the first reading sensor 3A to move in the left-right direction from a reading starting position being a position below a left end edge of the first reading surface 8A to a reading ending position being a position below a right end edge of the first reading surface 8A. By this configuration, the first reading sensor 3A reads an image on the original SH1 supported by the first reading surface 8A. Then, the controller controls the scanning mechanism driving source of the reading unit 3 to cause the scanning mechanism to move in the opposite direction to move the first reading sensor 3A which finished the reading operation from the right end to the left end within the reading unit 3 to thereby make the first reading sensor 3A return to its standby position.

Also, in the present image reading apparatus 1, when conveying the original SH2 supported by the original tray 91 using the ADF 4 and reading an image on the original SH2, the controller controls the scanning mechanism driving source of the reading unit 3 to activate the scanning mechanism and cause the first reading sensor 3A to stop at the resting reading position below the second reading surface 8B.

Then, the controller activates the feeding roller 41, the separating roller 42, the first conveying roller 43, the second conveying roller 44 and the ejecting roller 47 to convey the original SH2 supported by the original tray 91 along the conveyance guide 30.

When the original SH2 conveyed over the conveying surfaces 36, 39G1 and 39G2 passes over the second reading surface 8B, the controller reads an image on the original SH2 with the first reading sensor 3A at rest at the resting reading position.

When reading images on both sides of the conveyed original SH2, the controller activates the second reading sensor 3B as well as the first reading sensor 3A and reads an image on a side of the original SH2 opposite to the side to be read by the first reading sensor 3A using the second reading sensor 3B.

Then, the controller ejects the original SH2 from which one or two images are read toward the ejection tray 96 using the ejecting roller 47 and the ejecting pinch roller 47P.

<Behaviors of First Embodiment>

In the image reading apparatus 1 of the first embodiment, as shown in FIG. 5, when the openable part 9 is closed, the position of the positioning concave part 60 with respect to the positioning convex part 50 is fixed by the first inclined surface 61 contacting the portion of the curved surface 51 away from the top part 51T on the left and the second inclined surface 62 contacting a portion of the curved surface 51 away from the top part 51T on the right. Therefore, in the image reading apparatus 1, in the state where the openable part 9 is closed, the openable part 9 is positioned with respect to the main body part 8 accurately by the hinges 70 and the positioning convex part 50 and positioning concave part 60 contacting with each other.

Figure 6:
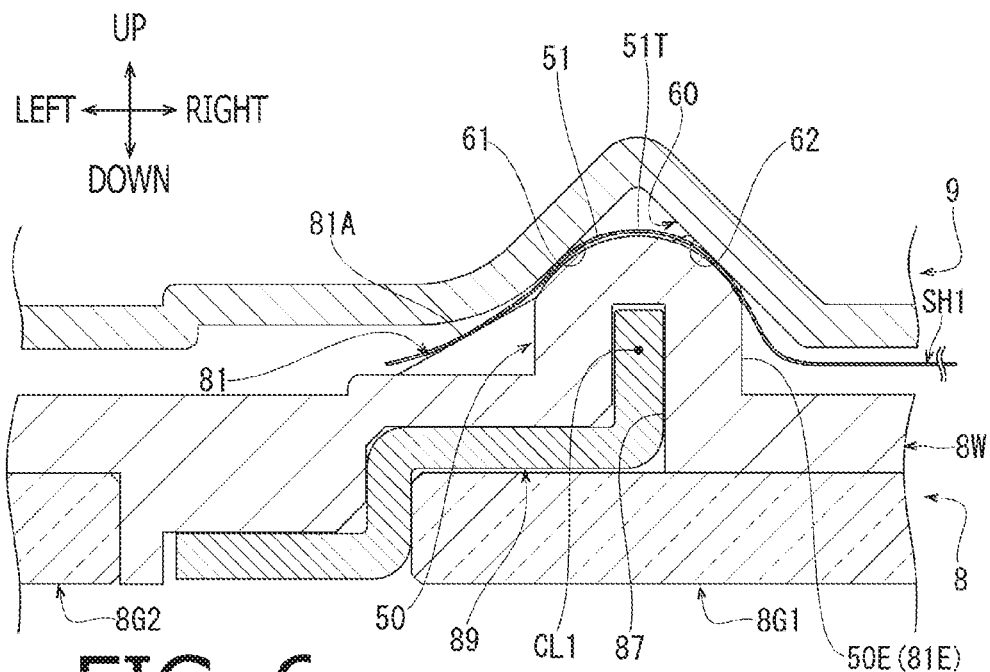
FIG. 6 is a partial cross-sectional view showing an original nipped between the positioning convex part and the positioning concave part.

In this image reading apparatus 1, as shown in FIG. 6, there is a case where a portion of the original SH1 placed onto the first reading surface 8A of the main body part 8 covers the positioning convex part 50 due to, for example, the original SH1 being misaligned with respect to the first reading surface 8A or the original SH1 being larger than the first reading surface 8A.

If the openable part 9 is closed in the state where a portion of the original SH1 is covering the positioning convex part 50, the original SH1 will be nipped between the positioning convex part 50 and the positioning concave part 60. In this case, the original SH1 will curve along the top part 51T of the curved surface 51, will be nipped between the portion of the curved surface 51 away from the top part 51T on the left and the first inclined surface 61 and will be nipped between the portion of the curved surface 51 away from the top part 51T on the right and the second inclined surface 62. As a result, the original SH1 will bidimensionally deform into a gentle mound shape. Therefore, in the present image reading apparatus 1, tridimensional deformation of the original SH1 and shearing force acting on the original SH1 can be suppressed and, as a result, it is less likely that tear or generation of holes occurs on the original SH1.

Figure 7:
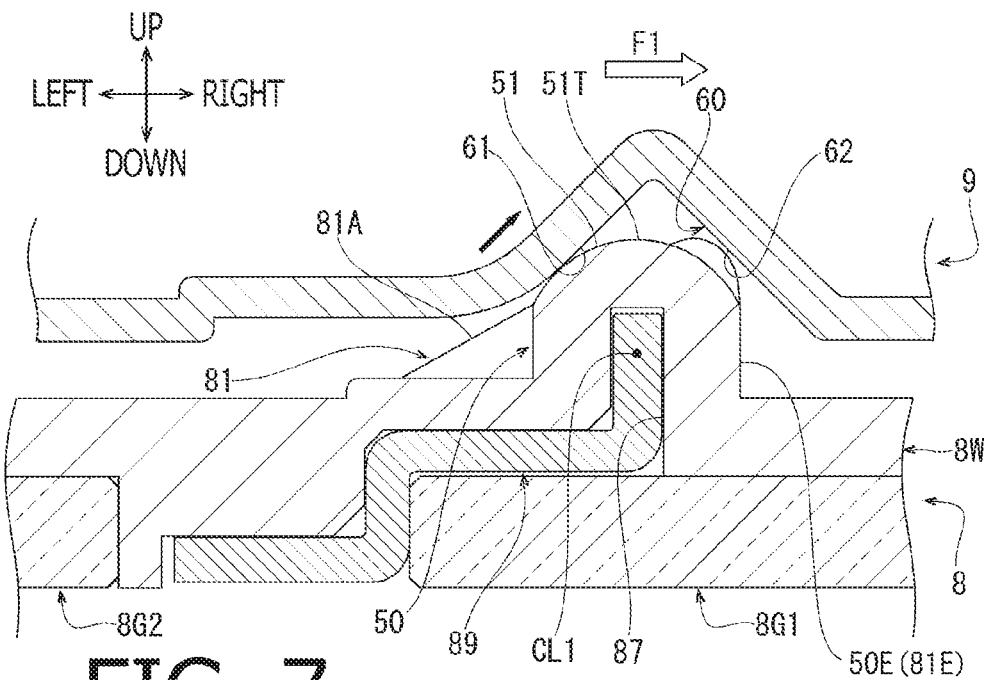
FIG. 7 is a partial cross-sectional view illustrating behavior of the positioning concave part with respect to the positioning convex part when force that causes a closed openable part to laterally slide acts on the openable part.
Figure 8:
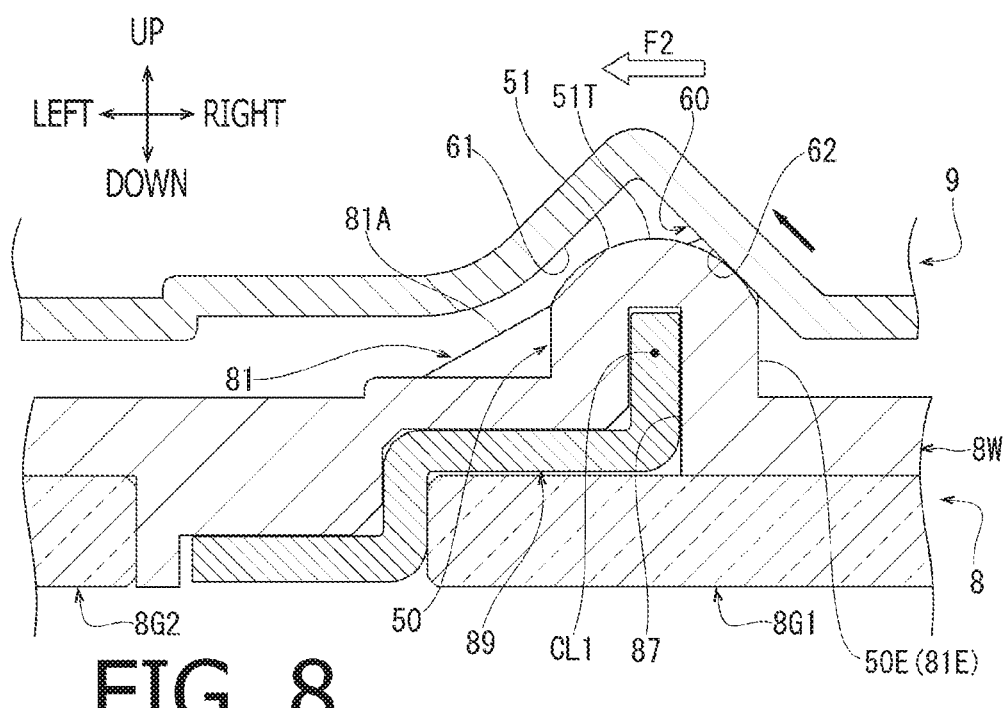
FIG. 8 is a partial cross-sectional view illustrating behavior of the positioning concave part with respect to the positioning convex part when force that causes the closed openable part to laterally slide acts on the openable part.

Furthermore, in the present image reading apparatus 1, as shown in FIGS. 7 and 8, there is a case where force that causes the closed openable part 9 to laterally slide, that is, force F1 or F2 that causes the closed openable part 9 to slide in the left-right direction, acts on the openable part 9.

As shown in FIG. 7, when the openable part 9 slides rightward by the rightward force F1, the first inclined surface 61 of the positioning concave part 60 moves obliquely upward and rightward while in contact with the curved surface 51 and thus the openable part 9 moves slightly upward and rightward.

Similarly, as shown in FIG. 8, when the openable part 9 slides leftward by the leftward force F2, the second inclined surface 62 of the positioning concave part 60 moves obliquely upward and leftward while in contact with the curved surface 51 and thus the openable part 9 moves slightly upward and leftward.

As a result, in the present image reading apparatus 1, it is less likely that shearing force acts on the positioning convex part 50.

Therefore, in the image reading apparatus 1 of the first embodiment, it is possible to suppress damage on the original SH1 when the openable part 9 is closed in the state where a portion of the original SH1 placed onto the first reading surface 8A of the main body part 8 is covering the positioning convex part 50 and to suppress damage on the positioning convex part 50 and the positioning concave part 60 even if the force that causes the closed openable part 9 to move laterally acts on the openable part 9.

Also, in the present image reading apparatus 1, as shown in FIG. 1, it is possible to position the openable part 9 with respect to the main body part 8 with the hinges 70 and a pair of the positioning convex part 50 and positioning concave part 60 being in contact with each other, and it is possible to reduce manufacturing cost and secure space for arranging other parts of the main body part 8 and the openable part 9 by the simple configuration of the immovable positioning convex part 50.

Furthermore, in the present image reading apparatus 1, as shown in FIGS. 3 and 4, the positioning convex part 50 is formed continuously with the first guide part 81 in the front-rear direction. By this configuration, it becomes possible to reduce deformation of the original SH1 covering the positioning convex part 50 as compared to a case where the first guide part 81 and the positioning convex part 50 are not continuous and there is a gap between them. Therefore, in the present image reading apparatus 1, surface pressure acting on the original SH1 covering the positioning convex part 50 can be dispersed and, as a result, it becomes possible to further suppress damage on the original SH1. Also, since the positioning convex part 50 is reinforced by being integrated with the first guide part 81, the positioning convex part 50 is less likely to be damaged.

Also, in the present image reading apparatus 1, as shown in FIG. 5, the reinforcing plate inserting part 87 and the reinforcing plate 89 provided on the lower surface side of the first guide part 81 extend up to the positioning convex part 50. By this configuration, the reinforcing plate 89 that reinforces the first guide part 81 also reinforces the positioning convex part 50. As a result, in the present image reading apparatus 1, even if the force F1 or F2 that causes the openable part 9 to laterally slide acts on the openable part 9 as shown in FIGS. 7 and 8, damage on the positioning convex part 50 can further be suppressed.

Furthermore, in the present image reading apparatus 1, as shown in FIG. 4, the end surface 50E extending in the up-down direction and in the front-rear direction on the first reading surface 8A side of the positioning convex part 50 is the flat surface that is coplanar with the end surface 81E extending in the up-down direction and in the front rear direction on the first reading surface 8A side of the first guide part 81. By this configuration, since an edge of the original SH1 placed onto the first reading surface 8A can be made to abut a wide flat surface formed by the end surface 81E of the first guide part 81 and the end surface 50E of the positioning convex part 50, it becomes possible to suppress the original SH1 covering the positioning convex part 50 due to sliding of the original SH1 in the left-right direction toward the second reading surface 8B.

Also, in the present image reading apparatus 1, as shown in FIG. 5, the curved surface 51 is the upper section of the cylindrical surface whose center line is the axis line CL1 extending in the front-rear direction below the top part 51T. By this configuration, since the curved surface 51 moderately gently curves, tridimensional deformation of the original SH1 nipped between the positioning convex part 50 and the positioning concave part 60 can further be suppressed and shearing force acting on the original SH1 can further be suppressed.

Furthermore, in this image reading apparatus 1, the angle α1 of downward inclination of the first inclined surface 61 with respect to the left-right direction and the angle α2 of downward inclination of the second inclined surface 62 with respect to the left-right direction are equal to or less than 45 degrees. By this configuration, since the first inclined surface 61 and the second inclined surface 62 moderately gently inclines, tridimensional deformation of the original SH1 nipped between the positioning convex part 50 and the positioning concave part 60 can further be suppressed and shearing force acting on the original SH1 can further be suppressed.

Second Embodiment

Figure 9:
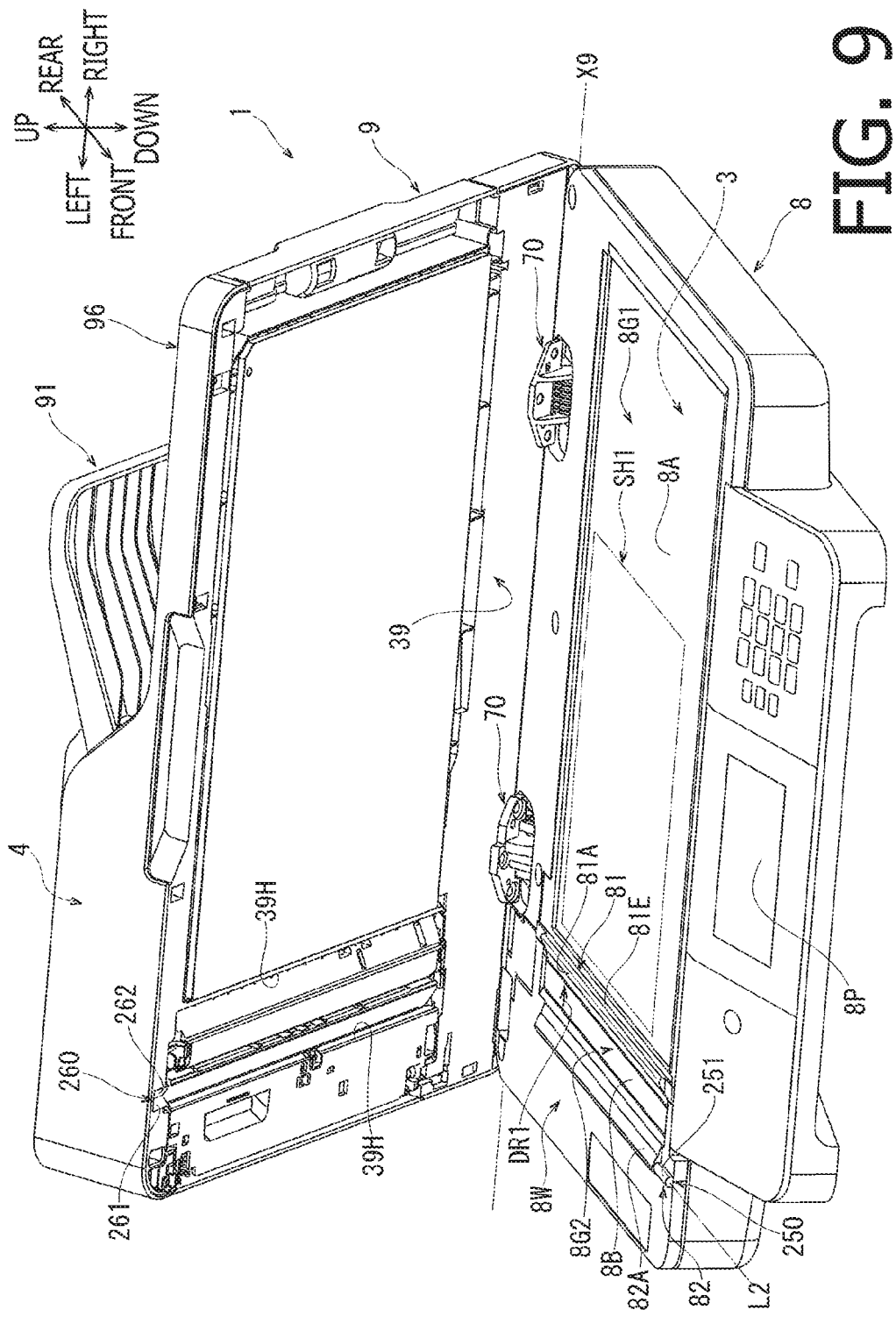
FIG. 9 is a perspective view of an image reading apparatus according to the second embodiment.
Figure 10:
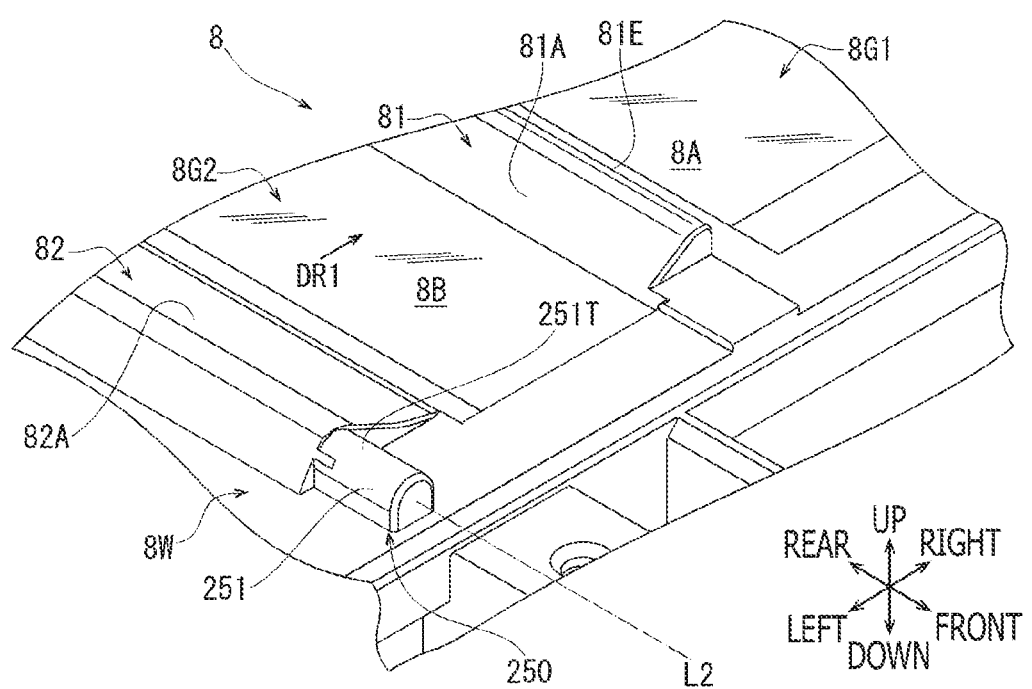
FIG. 10 is a partial perspective view showing mainly the second guide part and the positioning convex part.

As shown in FIGS. 9 and 10, in the image reading apparatus 1 according to the second embodiment, in place of the positioning convex part 50 and the positioning concave part 60 according to the image reading apparatus 1 of the first embodiment, a positioning convex part 250 and a positioning concave part 260 are provided.

Other configurations of the image reading apparatus 1 according to the second embodiment is similar to that of the image reading apparatus 1 according to the first embodiment. Accordingly, components identical to those in the first embodiment are assigned the same numerals as the first embodiment and descriptions thereof are herein omitted or simplified.

The positioning convex part 250 is provided on the upper surface of the main body part 8. The positioning convex part 250 is arranged on the frame 8W on the opposite side of the hinges 70 with respect to the first reading surface 8A and the second reading surface 8B and on an extended line L2 of the second guide part 82, and is protruding upward from the upper surface of the frame 8W. The positioning convex part 250 is formed continuously with the second guide part 82 in the front-rear direction.

The positioning convex part 250 has a curved surface 251. The curved surface 251 is curved downward from a top part 251T while extending leftward and rightward when viewed in the front-rear direction. Although not shown, as with the curved surface 51 according to the first embodiment, the curved surface 251 is an upper section of a cylindrical surface whose center line is an axis line extending in the front-rear direction below the top part 251T.

As shown in FIG. 9, the positioning concave part 260 is provided on the lower surface of the openable part 9. The positioning concave part 260 is arranged on the base member 39 on the opposite side of the hinges 70 with respect to the reading opening 39H.

Although not shown, as with the positioning concave part 60 according to the first embodiment, the positioning concave part 260 is arranged at a position opposing the positioning convex part 250 in a state where the openable part 9 is closed and is concaved upward from the lower surface of the base member 39.

The positioning concave part 260 has a first inclined surface 261 and a second inclined surface 262. Although not shown, as with the first inclined surface 61 according to the first embodiment, the first inclined surface 261 is a flat surface inclined downward toward the left when viewed in the front-rear direction in the state where the openable part 9 is closed and contacts a portion of the curved surface 251 away from the top part 251T on the left. Also, as with the second inclined surface 62 according to the first embodiment, the second inclined surface 262 is a flat surface inclined downward toward the right when viewed in the front-rear direction in the state where the openable part 9 is closed and contacts a portion of the curved surface 251 away from the top part 251T on the right.

As with the image reading apparatus 1 according to the first embodiment, with the image reading apparatus 1 according to the second embodiment 2 having the above-described configuration, it is possible to suppress damage on the original SH1 in the case where the openable part 9 is closed in the state where a portion of the original SH1 placed onto the first reading surface 8A of the main body part 8 is covering the positioning convex part 250 and to suppress damage on the positioning convex part 250 and the positioning concave part 260 even if the force that causes the closed openable part 9 to displace laterally acts on the openable part 9.

Also, with the image reading apparatus 1 according to the second embodiment 2, since the positioning convex part 250 and the positioning concave part 260 according to the second embodiment are positioned farther from the first reading surface 8A when compared to the positioning convex part 50 and the positioning concave part 60 according to the first embodiment, it is possible to reduce the likelihood of a portion of the original SH1 placed onto the first reading surface 8A covering the positioning convex part 250.

Hereinabove, the present disclosure has been described with reference to the first and second embodiments. However, aspects of the present disclosure are not limited to the above-described first and second embodiment but can be practiced while appropriately modifying the embodiments without departing from the idea of the present disclosure.

In the first and second embodiments, the curved surfaces 51 and 251 of the positioning convex parts 50 and 250 are portions of cylindrical surfaces. However, for example, a configuration in which a distance from the axis line CL1 to the curved surface 51 gets greater as distance from the top part 51T in the left-right direction gets greater is also included in the present disclosure.

Aspects of the present disclosure can also be practiced in, for instance, multi-function peripherals and the like.

What is claimed is:

1. An image reading apparatus comprising:
   a main body part to which a first reading surface onto which an original is to be placed, a second reading surface over which an original passes, and a first guide part arranged between the first reading surface and the second reading surface and configured to scoop up an original passing over the second reading surface are provided on an upper surface;
   an openable part provided above the main body part;
   an automatic document feeder provided to the openable part and configured to convey an original to pass over the second reading surface and the first guide part;
   a reading sensor provided within the main body part and capable of reading an image on an original placed onto the first reading surface and an image of an original passing over the second reading surface; and
   a hinge configured to couple the openable part to the main body part such that the openable part is swingable between an open position and a closed position,
   wherein when a direction parallel to a direction in which an original passes over the second reading surface while being conveyed parallel to the second reading surface is defined as a first direction, and a direction parallel to the second reading surface and orthogonal to the first direction is defined as a second direction:
      on the upper surface of the main body part, a positioning convex part protruding upward is provided, the positioning convex part being arranged on the opposite side of the hinge with respect to the first reading surface and the second reading surface on an extended line of the first guide part and protruding upward;
      on a lower surface of the openable part, a positioning concave part concaved upward is provided, the positioning concave part being arranged at a position opposing the positioning convex part in a state where the openable part is at the closed position;
      the positioning convex part has a curved surface curved downward from a top part while extending toward one side and the other side in the first direction when viewed in the second direction; and
      when viewed in the second direction in the state where the openable part is at the closed position, the positioning concave part has a first inclined surface being a flat surface inclined downward toward the one side in the first direction and contacting the curved surface, and a second inclined surface being a flat surface inclined downward toward the other side in the first direction and contacting the curved surface.

2. The image reading apparatus according to claim 1, wherein the positioning convex part is formed continuously with the first guide part in the second direction.

3. The image reading apparatus according to claim 2, further comprising:
   a reinforcing plate inserting part recessed upward from a lower surface of the first guide part and extending in the second direction along the first guide part; and
   a reinforcing plate extending in the second direction and configured to be inserted in the reinforcing plate inserting part to reinforce the first guide part,
   wherein the reinforcing plate inserting part and the reinforcing plate extends up to the positioning convex part.

4. The image reading apparatus according to claim 1,
   wherein an end surface of the positioning convex part extending in an up-down direction and in the second direction on the first reading surface side is coplanar with an end surface of the first guide part extending in the up-down direction and in the second direction on the first reading surface side.

5. The image reading apparatus according to claim 1,
   Wherein the curved surface is a section of a cylindrical surface whose center line is an axis line extending in the second direction below the top part.

6. The image reading apparatus according to claim 1,
   wherein an angle of downward inclination of the first inclined surface with respect to the first direction and an angle of downward inclination of the second inclined surface with respect to the first direction are equal to or less than 45 degrees.

7. An image reading apparatus comprising:
   a main body part to which a first reading surface onto which an original is to be placed, a second reading surface over which an original passes, and a second guide part arranged opposite to the first reading surface with respect to the second reading surface and configured to guide an original toward the second reading surface are provided on an upper surface;
   an openable part provided above the main body part;
   an automatic document feeder provided to the openable part and configured to convey an original to pass over the second guide part and the second reading surface;
   a reading sensor provided within the main body part and capable of reading an image on an original placed onto the first reading surface and an image of an original passing over the second reading surface; and
   a hinge configured to couple the openable part to the main body part such that the openable part is swingable between an open position and a closed position,
   wherein when a direction parallel to a direction in which an original passes over the second reading surface while being conveyed parallel to the second reading surface is defined as a first direction, and a direction parallel to the second reading surface and orthogonal to the first direction is defined as a second direction:
      on the upper surface of the main body part, a positioning convex part protruding upward is provided, the positioning convex part being arranged on the opposite side of the hinge with respect to the first reading surface and the second reading surface on an extended line of the second guide part;
      on a lower surface of the openable part, a positioning concave part concaved upward is provided, the positioning concave part being arranged at a position opposing the positioning convex part in a state where the openable part is at the closed position;
      the positioning convex part has a curved surface curved downward from a top part while extending toward one side and the other side in the first direction when viewed in the second direction; and when viewed in the second direction in the state where the openable part is at the closed position, the positioning concave part has a first inclined surface being a flat surface inclined downward toward the one side in the first direction and contacting the curved surface, and a second inclined surface being a flat surface inclined downward toward the other side in the first direction and contacting the curved surface.

\* \* \* \* \*

UNITED STATES PATENT AND TRADEMARK OFFICE
CERTIFICATE OF CORRECTION

PATENT NO. : 11,196,891 B2
APPLICATION NO. : 17/082162
DATED : December 7, 2021
INVENTOR(S) : Yoshihiro Oyama It is certified that error appears in the above-identified patent and that said Letters Patent is hereby corrected as shown below:

In the Claims

Column 15, Claim 1, Lines 42-43:
Please delete "the opposite side" and insert --an opposite side--

Column 16, Claim 3, Line 10:
Please delete "extends" and insert --extend--

Column 16, Claim 4, Line 14:
Please delete "the first reading surface side" and insert --a first reading surface side--

Column 16, Claim 7, Lines 55-56:
Please delete "the opposite side" and insert --an opposite side--

Signed and Sealed this
Twentieth Day of September, 2022

Katherine Kelly Vidal
*Director of the United States Patent and Trademark Office*